United States Patent [19]
Still et al.

[11] Patent Number: 5,925,869
[45] Date of Patent: Jul. 20, 1999

[54] MULTIPLE-INPUT, MIXED-TYPE BAR CODE PROCESSOR WITH SINGLE DECODER

[75] Inventors: Stephen E. Still, Lake Worth; Ira Baker, Opa Locka; Neal William Horner; James J. Tout, Jr., both of Boca Raton, all of Fla.

[73] Assignee: International Business Machines Corporation, Armonk, N.Y.

[21] Appl. No.: 08/932,756

[22] Filed: Sep. 17, 1997

[51] Int. Cl.⁶ ........................................ G06K 7/10
[52] U.S. Cl. ............................ 235/462.28; 235/462.25; 235/462.01
[58] Field of Search ................ 235/462.28, 462.01, 235/462.07, 462.15, 462.16, 462.18, 462.19, 462.25, 462.26, 462.27, 470, 454; 250/559.03, 559.04, 559.05

[56] References Cited

U.S. PATENT DOCUMENTS

| | | | |
|---|---|---|---|
| 4,639,606 | 1/1987 | Boles et al. | 235/462.25 |
| 5,245,168 | 9/1993 | Shigeta et al. | 235/462 |
| 5,260,553 | 11/1993 | Rockstein et al. | 235/462.01 |
| 5,274,396 | 12/1993 | Shimoda et al. | 346/107 |
| 5,536,928 | 7/1996 | Seigel | 235/462.15 |
| 5,552,590 | 9/1996 | Obata et al. | 235/455 |
| 5,565,670 | 10/1996 | Flaherty | 235/472 |
| 5,682,030 | 10/1997 | Kubon | 235/462.25 |
| 5,789,728 | 8/1998 | Barile et al. | 235/454 |

*Primary Examiner*—Michael G. Lee
*Attorney, Agent, or Firm*—Quarles & Brady LLP

[57] ABSTRACT

A multiple-input, mixed-type bar code processor, comprising: a plurality of retriggerable pulse generators, each having data inputs coupled to sources of potential representing fixed logic levels and each having at least one of a clear and a reset input coupled to a different one of a plurality of sources of input bar code data streams, for regenerating the input bar code data streams responsive to logic level transitions of the input bar code data streams, both when any input bar code data stream is logically low absent scanned data and when any other input bar code data stream is logically high absent the scanned data; a circuit for receiving all of the regenerated bar code data streams and generating a single output bar code data stream; and, a bar code data stream decoder coupled for receiving the single output bar code data stream. A method for processing multiple-input, mixed-type bar codes comprises the steps of: independently generating retriggerable pulses responsive to different ones of a plurality of input bar code data streams, at least one of which is logically low absent scanned data and at least one other of which is logically high absent scanned data; generating the retriggerable pulses with a width greater than a maximum time interval between logic level transitions within any of group of pulses in the bar code data streams corresponding to a single bar code read; and, combining all of the regenerated bar code data streams into a single output bar code data stream.

20 Claims, 3 Drawing Sheets

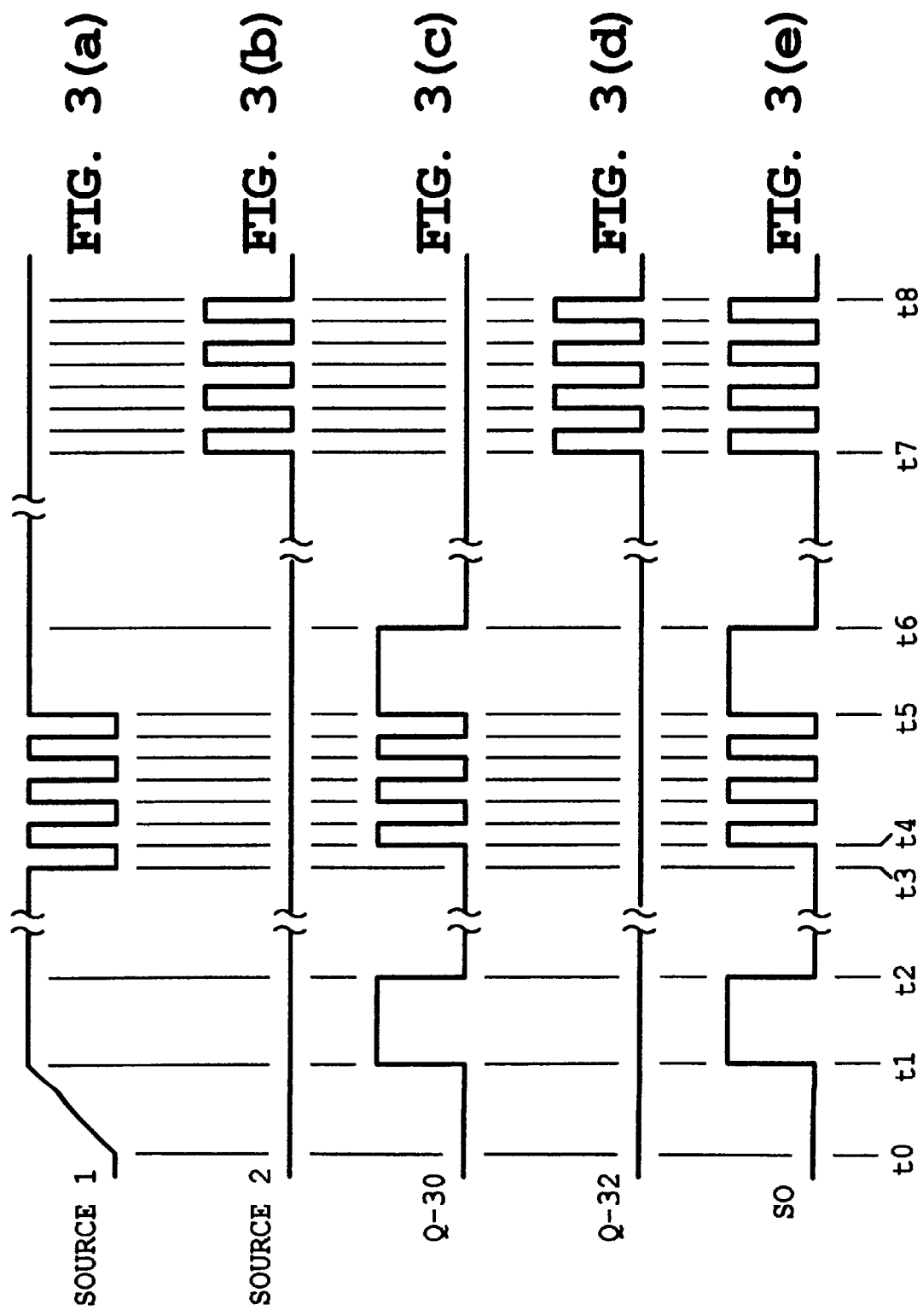

MULTIPLE-INPUT, MIXED-TYPE BAR CODE PROCESSOR WITH SINGLE DECODER

BACKGROUND OF THE INVENTION

1. Field of the Invention

This invention relates to the field of multiple-input bar code data stream decoding, and in particular, to multiple-input bar code data stream decoding from mixed types of bar code readers.

2. Description of Related Art

While devices exist to wedge, that is reconfigure, bar code data into the keyboard port of a computer, for example an IBM® computer, no devices exist which allow multiple bar code devices from different vendors to be connected simultaneously to a single bar code decoding processor. A technical problem stems from the fact that outputs from some bar code devices default to a logically high output level when idle, for example those available from Welch-Allyn, and some bar code devices default to a logically low output level when idle, for example those available from Hewlett Packard. This type of mixed format input data has precluded the logical AND'ing or OR'ing of outputs from these mixed-type sources of bar code data streams into a single data stream.

An RF wireless bar code scanner in U.S. Pat. No. 5,565,670 uses monostable multi vibrators OR'ed together as part of a data encoding scheme for the RF transmitter. A mechanism to print bar codes on the edges of photographic film in U.S. Pat. No. 5,274,396 uses a monostable multi vibrator to determine a forward or reverse movement of the film. A laser bar code scanner in U.S. Pat. No. 5,552,590 uses a single monostable multi vibrator in conjunction with a binary counter to determine the number of bar codes acquired during a single scan. A CCD type bar code scanner in U.S. Pat. No. 5,245,168 uses monostable multi vibrators to generate a CCD shift pulse signal and a LED control signal used to illuminate a bar code to be scanned. A bar code optical scanner in DE 3310201 uses monostable multi vibrators to control a bistable device to generate a single output signal from a dual element optical sensor.

None of the foregoing references, or any combination thereof, enables a plurality of bar code wands and slot readers of mixed-type to be permanently connected to a single bar code data stream decoder. More particularly, none teaches or suggests implementing a multiple-input mixed-type bar code data stream processor with retriggerable monostable multi vibrators for processing each bar code data stream.

SUMMARY OF THE INVENTION

In order to implement multiple-input, mixed-type bar code data stream processing, utilizing a single bar code data stream decoder, it is necessary to process the defaulting high and defaulting low bar code data streams in such a way that one of the data stream defaults is preserved and the other of the data stream defaults is, in effect, converted to the default condition of the other data stream. In order to be practical in terms of convenience, eliminating the need to even determine the default condition of any particular bar code reader, it is necessary that identical processing methods and apparatus be utilized. In order to be practical in terms of minimizing processing time, it is necessary that the different bar code data streams be processed independently of one another, and in parallel. Moreover, none of the foregoing requirements can be fulfilled unless all of the processing can be implemented without the loss of any data, that is, information content.

In accordance with an inventive arrangement, a signal generator in the form of a retriggerable monostable multi vibrator is placed in series with the data stream of each bar code device and the outputs of the signal generators are logically OR'ed together to produce a single output bar code data stream which can be decoded by a single bar code decoder.

In order to indicate when signals or input terminals are logically low or active low or respond to a logically high to logically low transition, often represented by an over bar, such active low signals or terminals will be preceded by a / symbol. The monostable multi vibrators are advantageously wired so that data from the sources of the bar code data streams is coupled to the /reset or the /clear input. The /A and B data inputs, on the other hand, are always connected to logically low and logically high sources of potential respectively, and accordingly, are always active. In this configuration, the Q output will always be reset, that is logically low, when the bar code data stream goes low, and the Q output will always go logically high when the bar code data stream goes high, which always triggers the start of the monostable period because the data inputs are always active. If the bar code data stream stays logically high, the Q output will go logically low after the capacitor of the timing network charges above a certain voltage threshold through a resistor of the timing network. The Q output will remain low until the bar code data stream undergoes a logically high to logically low transition, and then undergoes a logically low to logically high transition. This unique mode of operation can be utilized to provide the same polarity quiescent state at the output of each monostable irrespective of the default value, logically high or low, of each bar code data stream. As a result, the outputs of the monostables can be logically OR'ed and AND'ed as needed for further propagation to a single bar code decoder.

In accordance with this inventive arrangement, a multiple-input, mixed-type bar code processor, comprises: a plurality of retriggerable pulse generators, each having data inputs coupled to sources of potential representing fixed logic levels and each having at least one of a clear and a reset input coupled to a different one of a plurality of sources of input bar code data streams, for regenerating the input bar code data streams responsive to logic level transitions of the input bar code data streams at the clear or reset inputs, both when any input bar code data stream is logically low absent scanned data and when any other input bar code data stream is logically high absent the scanned data; at least one logic gate for receiving all of the regenerated bar code data streams and generating a single output bar code data stream; and, a bar code data stream decoder coupled for receiving the single output bar code data stream.

Each of the pulse generators can comprise a timing network adapted for generation of an output pulse having a width greater than a maximum time interval between logic level transitions within any group of pulses corresponding to a single bar code read.

The at least one logical gate coupled for receiving all of the output pulses can be an OR gate.

Each pulse generator preferably comprises a monostable multi vibrator. Each pulse generator preferably generates output pulses responsive only to like logic level transitions of the input bar code data streams.

At least one of the monostables can comprise both clear and reset inputs, the clear and reset inputs of the at least one monostable being coupled to one another and to the different bar code data stream of the at least one monostable.

In accordance with another inventive arrangement, a method for processing multiple-input, mixed-type bar codes comprises the steps of: independently generating retriggerable pulses responsive to different ones of a plurality of input bar code data streams, at least one of which is logically low absent scanned data and at least one other of which is logically high absent the scanned data; generating the retriggerable pulses with a width greater than a maximum time interval between logic level transitions within any of group of pulses in the a bar code data read; and, combining all of the regenerated bar code data streams into a single output bar code data stream. The method can further comprise the step of decoding the single output bar code data stream with a single decoder.

The method can also further comprise the step of generating the output pulses responsive only to like logic level transitions of the pulses in the bar code data streams.

The method can still further comprise the step of logically OR'ing all of the regenerated bar code data streams into the single output bar code data stream.

BRIEF DESCRIPTION OF THE DRAWINGS

FIGS. 3(a), 3(b), 3(c), 3(d), and 3(e) are timing diagrams useful for explaining the operation of the block diagram and circuit schematic shown in FIGS. 1 and 2 respectively.

DETAILED DESCRIPTION OF THE PREFERRED EMBODIMENTS

Figure 1:
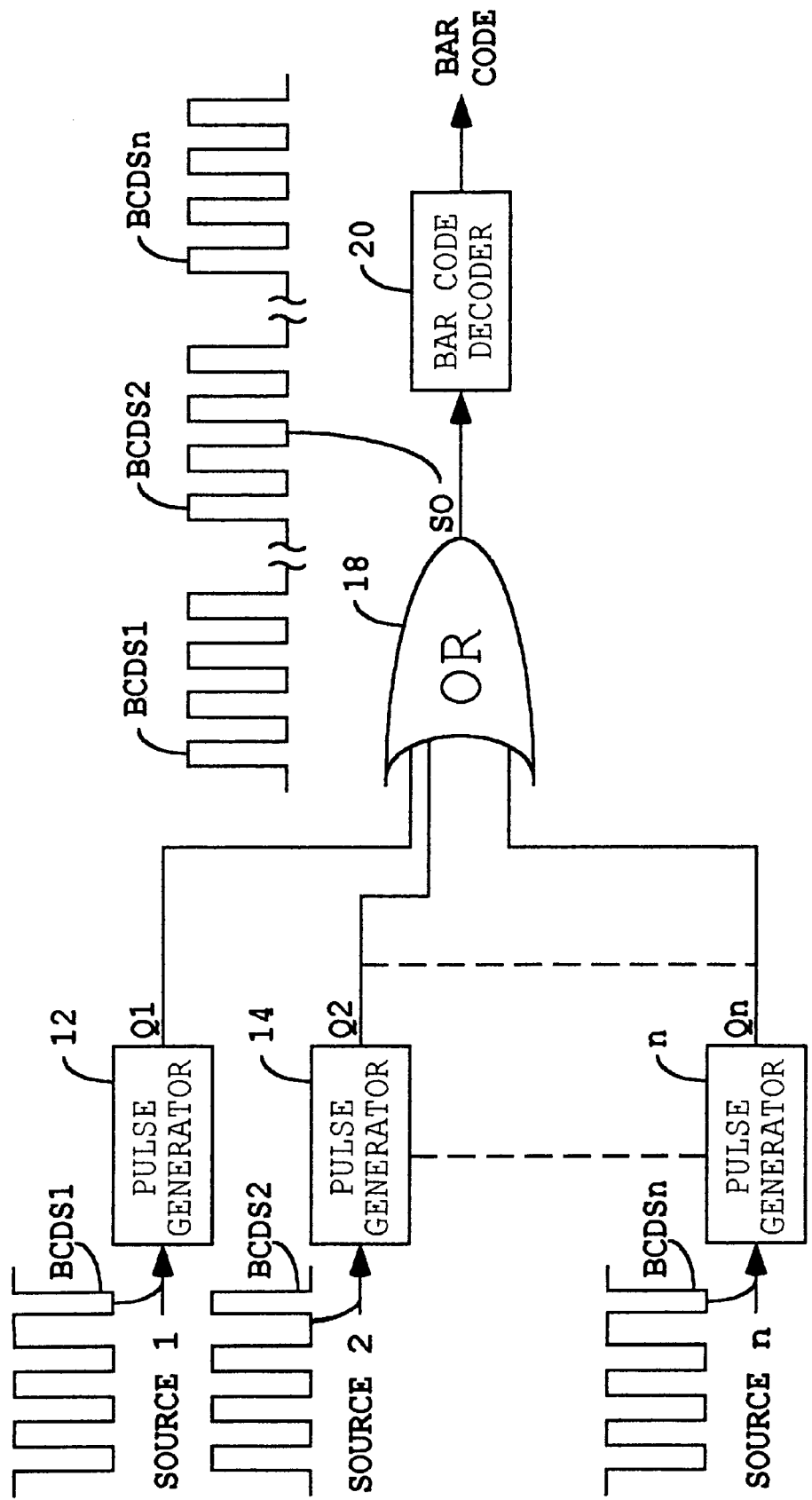
FIG. 1 is a block diagram of a multiple-input, mixed-type bar code processor in accordance with an inventive arrangement.

A multiple-input, mixed-type bar code processor in accordance with an inventive arrangement is shown in block diagram form in FIG. 1 and generally designated by reference numeral 10. The processor 10 comprises a plurality of pulse generators. The number of pulse generators has no particular limit insofar as the inventive arrangements are concerned, and accordingly, only three pulse generators out of n pulse generators are shown in FIG. 1, designated 12, 14 and n.

Pulse generator 12 is coupled for receiving a first bar code data stream BCDS1 from a first bar code reader, for example, a wand or slot reader, designated Source 1. As can be seen from the illustrated waveform BCDS1, the bar code data stream generated by Source 1 has a default or quiescent state which is logically high. Pulse generator 14 is coupled for receiving a second bar code data stream BCDS2 from a second bar code reader, for example, a wand or slot reader, designated Source 2. As can be seen from the illustrated waveform BCDS2, the bar code data stream generated by Source 2 has a default or quiescent state which is logically low. Pulse generator n is coupled for receiving an $n^{th}$ bar code data stream BCDSn from an $n^{th}$ bar code reader, for example, a wand or slot reader, designated Source n. As can be seen from the illustrated waveform BCDSn, the bar code data stream generated by Source n has a default or quiescent state which is logically high.

It should be appreciated that in typical bar code data streams, the information content is in the logically low to logically high transitions.

The respective outputs Q1, Q2 and through Qn of the pulse generators are inputs to means for combining the different bar code data streams into a single output bar code data stream designated SO. The combining means is illustrated as at least one logical gate 18, an OR gate. The single output SO is shown as including the information content of bar code data stream BCDS1, BCDS2 and BCDSn. The single output SO of the OR gate 18 is an input to a single bar code decoder 20, the only bar code decoder needed by the processor 10. The decoded Bar Code signals are supplied for further processing.

Figure 2:
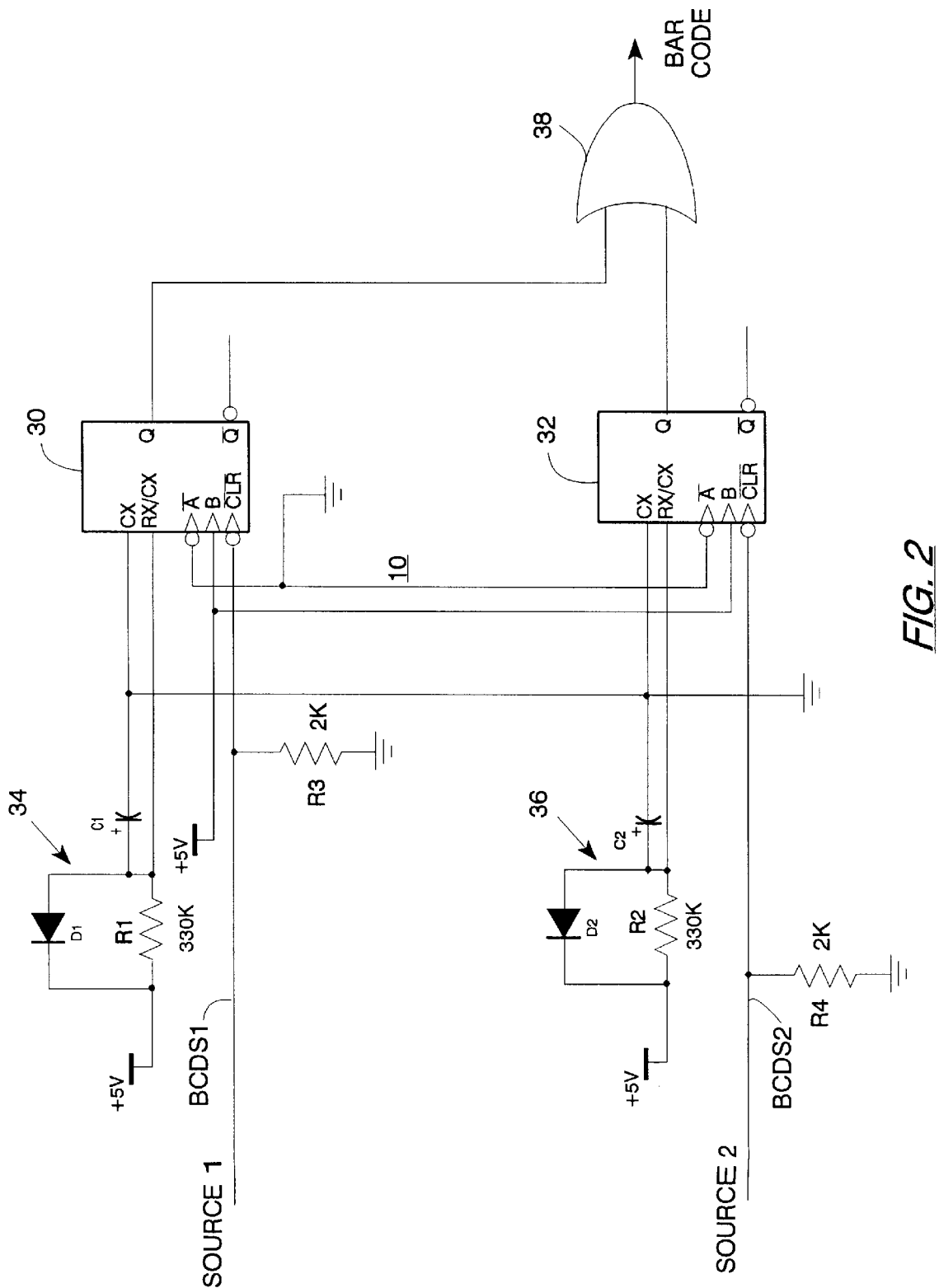
FIG. 2 is a circuit schematic of a preferred embodiment for implementing the processor shown in FIG. 1.

A partial circuit schematic of the multiple-input, mixed-type bar code processor 10 is shown in FIG. 2. Only two pulse generators are illustrated for purposes of simplicity, one for Source 1 and the other for Source 2. As in FIG. 1, the bar code data stream generated by Source 1 has a default or quiescent state which is logically high and the bar code data stream generated by Source 2 has a default or quiescent state which is logically low. The pulse generators are advantageously embodied as retriggerable monostable multi vibrators 30 and 32.

Retriggerable monostable multi vibrators 30 and 32 are illustrated as industry type 74HC123. As is typical, the monostables 30 and 32 of this type have one /A data input terminal, one B data input terminal and one /clear (/CLR) input terminal. The /A data input terminals are coupled to a source of ground potential. The B data input terminals are coupled to a source of logically high voltage potential, for example +5 volts.

The /clear input terminal of monostable 30 is coupled for receiving the bar code data stream BCDS1 from Source 1, and is also coupled to a source of ground potential through resistor R3. The /clear input terminal of monostable 32 is coupled for receiving the bar code data stream BCDS2 from Source 2, and is also coupled to a source of ground potential through resistor R4. The Q output terminal of monostable 30 is an input to an OR gate 38. The Q output terminal of monostable 32 is also an input to the OR gate 38. The /Q output terminals of both monostables 30 and 32 are unused.

Monostables other than those shown in FIG. 2 can have only a reset input terminal or can have both a clear input terminal and a reset input terminal. If such monostables are utilized, it is expected that the clear and reset input terminals of the respective monostables would be connected to one another and to one of the different bar code data streams, although this will depend upon the particular operating characteristics of particular monostables. Accordingly, the inventive arrangements are deemed to encompass, without limitation, monostable having a clear input terminal, a reset input terminal, or both, which can be connected to one another if appropriate, whether or not such terminals are designated clear or reset terminals, provided such terminals generally correspond in function to the clear and reset terminals described herein. This structural arrangement of a clear input or a reset input or both will also be referred to herein as each monostable having at least one of a clear and a reset input coupled to a different one of a plurality of sources of input bar code data streams. The monostable in such a description shall not be deemed to necessarily have both clear and reset inputs, although it can have both clear and reset inputs.

The monostables 30 and 32 also have pulse width resistive-capacitive timing networks 34 and 36 respectively. Timing network 34 comprises resistor R1, a polarized capacitor C1 and a diode D1, coupled in series with capacitor C1 and in parallel with resistor R1, for clamping the voltage at the RX/CX terminal of monostable 30 to no higher than one diode drop above a Vcc (+5 volt) source of potential during power down. The cathode terminal of the capacitor C1 and the CX terminal of the monostable 30 are coupled to a source of ground potential.

Timing network 36 comprises resistor R2, a polarized capacitor C2 and a diode D2, coupled in series with capacitor C2 and in parallel with resistor R2, for clamping the voltage at the RX/CX terminal of monostable 32 to no higher than one diode drop above the Vcc (+5 volt) source of potential during power down. The cathode terminal of the capacitor C2 and the CX terminal of the monostable 32 are coupled to a source of ground potential. The timing networks determine the width of the pulses generated at the Q output terminals, absent a retriggering of the monostables.

Diodes D1 and D2 can be industry type MMBD6050T. Capacitors C1 and C2 can be 16 volt tantalum capacitors. Resistors R1, R2, R3 and R4 can have 5% tolerance ratings.

It will be appreciated that the pulse generators embodied by the retriggerable monostable multi vibrators are identical to one another, and accordingly, there is no need to connect any particular source of a bar code data stream to one of the pulse generators rather than to a different one of the pulse generators on the basis of the logic level of the default or quiescent state of the bar code data stream, or on any other basis.

The operation of the circuit shown in FIGS. 1 and 2 is explained in connection with the timing diagrams of FIGS. 3(a), 3(b) and 3(c). Consistent with FIGS. 1 and 2, it is assumed the bar code data stream supplied by Source 1 to the /clear input terminal of monostable 30, shown in FIG. 3(a), defaults logically high and that the bar code data stream supplied by Source 2 to the /clear input terminal of monostable 32, shown in FIG. 3(b), defaults logically low. The Q output of monostable 30, hereinafter designated Q-30, is shown in FIG. 3(c). The Q output of monostable 32, hereinafter designated Q-32, is shown in FIG. 3(d). The combined single output signal SO at the output of gates 18 or 38 is shown in FIG. 3(e).

Initially, the logically high quiescent or default value of BCDS1 is established in the time interval between t0 and t1. The output Q-30 of monostable 30 will generate a logically high output pulse when the quiescent value is high enough, for example from time t1 to time t2, but will return to a logically low condition during subsequent inactivity beginning at time t1 and extending beyond time t2. The time interval between times t1 and t2 is determined by the timing network 34.

Initially, the quiescent or default value of BCDS2 is logically low, and accordingly, the output Q-32 of monostable 32 starts and remain logically low during inactivity extending from time t0 until time t7.

During bar code reads, the bar code data streams BCDS1 and BCDS2 will transition multiple times between logically high and low levels. The outputs of the monostables will exactly follow the bar code data stream levels, because the monostables' time-out period is selected by choosing the values of the components of the timing network to generate a pulse having a width greater than a maximum time interval between logic level transitions within any group of pulses in the bar code data streams corresponding to a single bar code read. The selected values for the components of the timing network are also chosen so that the monostables' outputs will go logically low in a reasonable period of time, thereby allowing another bar code read from any of the sources to begin. In this regard, a signal traffic control system, not shown, can be implemented, which can include one or more buffers to temporarily hold bar code read signals where there are many sources of bar code data streams operating simultaneously.

Referring to FIG. 3(a), the bar code data stream BCDS1 begins logic level transitions with a logically high to logically low transition at time t3, which is ignored by monostable 30, as is apparent from the low level of Q-30 shown in FIG. 3(c). It must be remembered that in typical bar code data streams, the information content is in the logically low to logically high transitions. However, the logically low to logically high transition at time t4 is tracked by Q-30, as is each transition thereafter, through time t5. A full width pulse is generated at Q-30 after time t5, which ends at time t6 Thereafter, bar code data stream BCDS1 remains logically high and Q-30 remains logically low, until bar code data stream BCDS1 goes logically low and logically high after the next bar code read at Source 1.

Referring to FIG. 3(b), the bar code data stream BCDS2 is initially at a logically low level from time t0, as is Q-32 shown in FIG. 3(d). The logically low to logically high transition of bar code data stream at t7 is tracked by Q-32, as is each transition thereafter, in each direction, through time t8. From time t8, bar code data stream BCDS2 remains logically low and Q-32 remains logically low, until bar code data stream BCDS2 goes logically high again after the next bar code read at Source 2.

The combined output signal OS of gate 38 in FIG. 2, or gate 18 in FIG. 1, is shown in FIG. 3(e).

This invention may be embodied in other specific forms without departing form the spirit or essential attributes thereof. Accordingly, reference should be made to the appended claims, rather than to the foregoing specification, as indicating the true scope of the inventive arrangement taught herein.

What is claimed is:

1. A multiple-input bar code processor, comprising:
   a plurality of retriggerable pulse generators, each having data inputs coupled to sources of potential representing fixed logic levels and each having at least one of a clear and a reset input coupled to a different one of a plurality of sources of input bar code data streams, for regenerating said input bar code data streams responsive to logic level transitions of said input bar code data streams, both when any input bar code data stream is logically low absent scanned data and when any other input bar code data stream is logically high absent said scanned data;
   means for receiving all of said regenerated bar code data streams and generating a single output bar code data stream; and,
   a bar code data stream decoder coupled for receiving said single output bar code data stream.

2. The processor of claim 1, wherein each of said pulse generators comprises a timing network adapted for generation of an output pulse having a width greater than a maximum time interval between logic level transitions within any group of pulses in said bar code data streams corresponding to a single bar code read.

3. The processor of claim 2, wherein said receiving and generating means comprises at least one logical gate coupled for receiving all of said output pulses and implementing an OR function for propagating said single output bar code data stream.

4. The processor of claim 3, wherein each of said pulse generators comprises a monostable multi vibrator.

5. The processor of claim 2, wherein each of said pulse generators comprises a monostable multi vibrator.

6. The processor of claim 5, wherein each of said pulse generators generates said output pulses responsive only to the logic level transitions of said input bar code data streams.

7. The processor of claim 2, wherein each of said pulse generators generates said output pulses responsive only to the logic level transitions of said input bar code data streams.

8. The processor of claim 1, wherein said receiving and generating means comprises at least one logical gate coupled for receiving all of said regenerated bar code date streams and implementing an OR function for propagating said single output bar code data stream.

9. The processor of claim 1, wherein each of said pulse generators comprises a monostable multi vibrator.

10. The processor of claim 1, wherein each of said pulse generators generates a output pulses responsive only to the logic level transitions of said input bar code data streams.

11. The processor of claim 1, wherein at least one of said monostables comprises both said clear and said reset inputs, said clear and said reset inputs of said at least one monostable being coupled to one another and to said different bar code data stream of said at least one monostable.

12. A method for processing multiple-input bar codes, comprising the steps of:

independently generating retriggerable pulses responsive to different ones of a plurality of input bar code data streams, at least one of which is logically low absent scanned data and at least one other of which is logically high absent said scanned data wherein each data stream includes data inputs coupled to sources of potential representing fixed logic levels and each data stream includes at least one of a clear and a reset input coupled to a different one of a plurality of sources of input bar code data streams;

generating said retriggerable pulses with a width greater than a maximum time interval between logic level transitions within any of group of pulses in said bar code data streams corresponding to a single bar code read; and, combining all of said regenerated bar code data streams into a single output bar code data stream.

13. The method of claim 12, further comprising the step of decoding said single output bar code data stream.

14. The method of claim 13, further comprising the step of generating said output pulses responsive only to the logic level transitions of said pulses in said groups.

15. The method of claim 13, further comprising the step of logically OR'ing all of said regenerated bar code data streams into said single output bar code data stream.

16. The method of claim 12, further comprising the step of generating said output pulses responsive only to the logic level transitions of said pulses in said groups.

17. The method of claim 16, further comprising the step of generating said pulses as logically active high signals.

18. The method of claim 17, further comprising the step of generating said output pulses responsive to logically low to logically high level transitions of said pulses in said groups.

19. The method of claim 12, further comprising the step of generating said pulses as logically active high signals.

20. The method of claim 12, further comprising the step of logically OR'ing all of said regenerated bar code data streams into said single output bar code data stream.

* * * * *

UNITED STATES PATENT AND TRADEMARK OFFICE
CERTIFICATE OF CORRECTION

PATENT NO. : 5,925,869

DATED : July 20, 1999

INVENTOR(S) : Stephen E. Still, et al.

It is certified that error appears in the above-identified patent and that said Letters Patent is hereby corrected as shown below:

Title page: Abstract delete the sentence "A method for processing multiple-input, mixed type bar codes comprises the steps of: independently generating retriggerable pulses responsive to different ones of a plurality of input bar code data streams, at least one of which is logically low absent scanned data and at least one other of which is logically high absent scanned data; generating the retriggerable pulses with a width greater than a maximum time interval between logic level transitions within any of group of pulses in the bar code data streams corresponding to a single bar code read; and, combining all of the regenerated bar code data streams into a single output bar code data stream."

UNITED STATES PATENT AND TRADEMARK OFFICE
CERTIFICATE OF CORRECTION

PATENT NO. : 5,925,869
DATED : July 20, 1999
INVENTOR(S) : Stephen E. Still, et al It is certified that error appears in the above-identified patent and that said Letters Patent is hereby corrected as shown below:

Column 4, line 48 replace "monostable" with --monostables--

Signed and Sealed this

Sixth Day of June, 2000

Attest:

Q. TODD DICKINSON

*Attesting Officer*     *Director of Patents and Trademarks*